May 24, 1932.　　　T. F. NOONAN　　　1,860,263
BAR METER CONSTRUCTION
Filed June 6, 1928
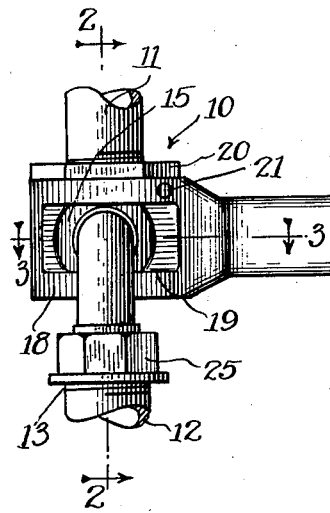
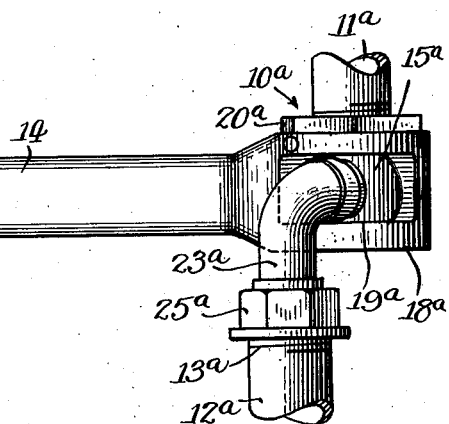
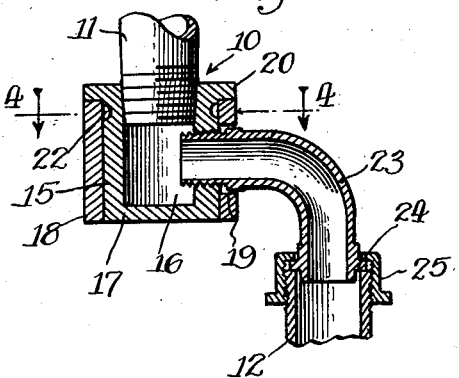
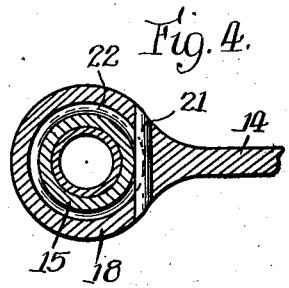
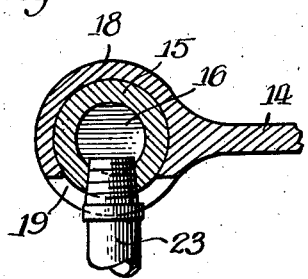
Inventor:
Thomas F. Noonan,
By Chindahl Parker Carlson
Attys.

Patented May 24, 1932

1,860,263

UNITED STATES PATENT OFFICE

THOMAS F. NOONAN, OF CHICAGO, ILLINOIS, ASSIGNOR TO THE LATTIMER-STEVENS COMPANY, OF COLUMBUS, OHIO, A CORPORATION OF OHIO

BAR METER CONNECTION

Application filed June 6, 1928. Serial No. 283,439.

The present invention relates to improvements in bar meter connections adapted primarily for use on gas meters, and has as one of its objects the provision of a novel connection which will not leak gas.

Many gas meters, such as those of the tin-case type, have the inlet and outlet fittings arranged in parallel spaced relation at the top of the casing. Usually, these fittings are located at opposite sides of the casing, and project upwardly into the same horizontal plane. The ends of the fittings are screw-threaded for attaching the gas inlet and outlet lines.

Heretofore, bar meter connections have been provided with inlet and outlet openings in opposite ends, and with offset swivel connections adjustably threaded from the underside of the bar connection into said openings, and adapted to be attached to the inlet and outlet fittings of the meter. The swivel connections, by reason of their threaded engagement with the bar connection, permit adjustment of the spread so as to adapt the device to differently sized meters.

A bar connection of this type also has a union outlet with which the outlet swivel connection communicates. This outlet comprises a threaded clamp washer to which the gas pipe is adapted to be secured.

Heretofore, many difficulties have been encountered in the use of these prior bar connections. In adjusting the spread of the swivel connections or in connecting the swivel connections to the bar connection, one may be threaded further than the other into the bar connection, thereby rendering them unequal in length. Obviously, with one swivel connection longer than the other, it is impossible to secure both squarely to the meter fittings. This difficulty limits the adjustment of the device to fit meters of different sizes, and in fact an accurate fit can be obtained only on one particularly sized meter, for example a five light meter. It will be understood that the spread of the meter fittings in meters of the same general size may vary due to inaccuracies resulting in the manufacture thereof.

Workmen installing the meters and the bar meter connections generally will use force to secure the parts together even though these parts do not fit squarely together, thereby setting up strains which frequently result in leakage. The washer in the outlet union also is subject to shrinkage which frequently results in leakage. The leakage of gas may be slight, and hence may be undetected for a long time. In many instances the leakage is large. The leakage of gas is a matter of much concern, particularly in large plants, and represents a large loss of money yearly. It is also injurious to health, and increases fire hazard. The cost of repairing the leaks results in an additional loss.

An important object of the invention, therefore, is to provide a novel bar meter connection which is in the nature of a templet so as to prevent the parts from being secured together unless they fit squarely together. This insures a proper installation of the meter.

Other objects are to provide a new and improved bar meter connection which has a wide range of adjustment in spread, in which the swivel connections have a fixed threaded engagement with the bar connection and can be adjusted laterally without varying the height, and in which no union washer is used.

A general object is to provide a novel bar meter connection which is simple and inexpensive in construction, and which requires but a small space.

Further objects and advantages will become apparent as the description proceeds.

In the accompanying drawings,

Figure 1 is a side elevational view of a device embodying the features of my invention.

Fig. 2 is a fragmentary sectional view taken along line 2—2 of Fig. 1.

Fig. 3 is a fragmentary sectional view taken along line 3—3 of Fig. 1.

Fig. 4 is a fragmentary sectional view taken along line 4—4 of Fig. 2.

While the invention is susceptible of various modifications and alternative constructions, I have shown in the drawings and will herein describe in detail the preferred embodiment, but it is to be understood that I do not thereby intend to limit the invention to the specific form disclosed, but intend to cover all modifications and alternative constructions falling within the spirit and scope of the invention as expressed in the appended claims.

Referring to the exemplary embodiment of the invention illustrated in the drawings, the bar connection comprises a pair of adjustable coupling devices 10—10$^a$ for connecting the inlet and discharge gas mains or service pipes 11—11$^a$, shown in fragment, to the inlet and discharge fittings 12—12$^a$, shown in fragment, of a gas meter (not shown). While the invention is not limited to the specific location of the fittings 12—12$^a$ on the meter, they are customarily arranged in parallel spaced relation with their free ends projecting into the same plane, preferably upwardly. The free ends of the fittings 12—12$^a$ are threaded as indicated at 13—13$^a$ for attachment of the devices 10—10$^a$. The latter are connected by a suitable spacing member or connecting bar 14 which may be of any suitable construction, and which serves to space the devices approximately the same as the fittings 12—12$^a$. Preferably, the chambered coupling devices 10—10$^a$ are alike in construction, and hence but one will be described in detail, the like parts of the other being designated by the same reference characters distinguished by the letter "a".

The device 10 comprises a suitable member 15 having an inlet opening 16. In the instance of the member 15$^a$, the opening 16$^a$ is an outlet opening. The member 15 may be of any suitable form, and in the present instance is cylindrical in form, and is closed at one end by an end wall 17, and internally threaded in the other end for the reception of the pipe 11.

The sleeve member 15, which may be called a swivel head, is pivotally mounted in a supporting ring or sleeve 18. This sleeve is formed integral with the end of the bar 14, and is cut away in one side to form a slot or opening 19 exposing an intermediate portion of the head 15. A flange 20, preferably hexagonal in form to facilitate attachment of the swivel head to the pipe 11, is formed on one end of the head 15 to overlie and bear against one end of the supporting ring 18. A spline pin 21 in the ring 18 engages a peripheral groove 22 in the head 15 to hold the latter against endwise movement.

An offset swivel connection 23 extends through the opening 19 into threaded engagement with one side of the member 15. The swivel connection may be of any suitable form and, preferably, comprises a pipe bent into an L-shape so as to have a free depending portion adapted to be arranged in alinement with the meter pipe 12. The free end of the swivel is adapted to enter the fitting 12, and is formed at a short distance from its end with a peripheral retaining flange 24 adapted to rest squarely against the end of the meter pipe 12. Loosely secured on the connection 23 is a gland nut 25 of suitable construction which is adapted to engage the retaining flange 24 and to be threaded onto the pipe 12 to secure the parts tightly together.

In installing the meter with the bar connection the inlet and outlet gas pipes 11—11$^a$ are adapted to be secured to the swivel heads 15—15$^a$. The latter are adjusted in the supporting or retaining rings 18—18$^a$ to give the swivel connections 23—23$^a$ the proper spread so that the latter will correspond accurately with the spread of the meter pipes 12—12$^a$. The swivel connections 23—23$^a$ are then secured squarely to the meter fittings by tightening the gland nuts 25—25$^a$ over the latter. Obviously, if the meter fittings do not project into the same horizontal plane, it will be impossible to tighten both of the swivel connections, the bar connection 14 acting as a templet to prevent the workman from improperly assembling the parts. The swivel connections 23—23$^a$ can be adjusted to put their outlets different distances apart. In this way, a gas tight connection is obtained so that the frequent difficulty with gas leakage is entirely avoided. Since the bar meter connection comprises no connecting washers for the gas pipes, no leakage of gas can result from the shrinkage of such washers or inaccuracies in the construction thereof.

From the construction shown and described it is obvious that the sleeve members 15—15$^a$ can be first and alone turned onto the service pipes 11 and 11$^a$ and the bar afterwards shifted towards the sleeve members on the service pipes to effect the seating of the sleeve members in the transverse sockets of the bar, the spline pins 21 being finally inserted to secure the bar to the sleeve members. The fact that the flanges 20—20$^a$ are at the upper ends of the sleeves permits the mode of application just described and said flanges serve as stops to limit the upward movement of the bar onto the sleeve members.

I claim as my invention:

1. A meter connection comprising a connecting bar formed with two spaced chambered retaining members, two swivel heads one rotatably secured in each retaining member, and an L-shaped swivel connection secured to the side of and communicating with the interior of each swivel head, said members being slotted to permit adjustment of said connections.

2. A meter connection comprising a connecting bar, a head directly and rotatably seated and secured in each of the ends of said bar, and an offset swivel connection secured to each swivel head, said bar being slotted to permit a limited angular adjustment of said swivel connections.

3. In a meter connection, the combination of a rigid bar adapted to extend substantially horizontally and provided at the ends thereof with substantially cylindrical sockets extending transversely therethrough, a pair of substantially cylindrical sleeve members provided with screw threads whereby they may be connected to the ends of a pair of gas pipes, said sleeve members being so constructed and arranged as to be insertable axially into said sockets by shifting the bar towards the gas pipes, and shaped to fit in said sockets, means for holding said members against axial displacement with respect to the bar after insertion into the sockets, and coupling nipples connected to and depending from the sleeve members and provided with means at the lower ends thereof for connection to the tubes of the meter.

4. In a meter connection, the combination of a rigid bar adapted to extend substantially horizontally and provided at the ends thereof with sockets each forming a one piece bearing extending transversely therethrough, a pair of sleeve members shaped to fit in said sockets and provided with means for limiting the upward movement of said bar onto said sleeve members and with screw threads whereby they may be connected to the ends of a pair of gas pipes and the bar connected therewith by shifting the bar towards the gas pipes, means for holding said members against axial displacement with respect to the bar after insertion into the sockets, and coupling nipples connected to and depending from the sleeve members and provided with means at the lower ends thereof for connection to the tubes of the meter.

5. A connection for holding in spaced relation the two service pipes of a gas meter provided with two tubes, said connection comprising in combination a rigid bar adapted to extend substantially horizontally and provided at the ends thereof with vertical sockets extending therethrough, a pair of vertical sleeve members provided at their upper ends with screw threads whereby they may be connected to the lower ends of said service pipes, said sleeve members shaped to fit in a fixed substantially vertical position only in said sockets and being insertable into the sockets while in connected relation with the service pipes by shifting the bar upwardly toward said service pipes and sleeve members, means for holding said sleeve members against vertical displacement with respect to the bar after insertion into the sockets, and coupling nipples connected to and depending from the sleeve members and provided with means for connection with the tubes of the meter.

6. Means for spacing the service pipes of a meter and communicatingly connecting the service pipes with the pipes of the meter comprising a rigid one-piece bar having at one end thereof means for engaging one of the service pipes and having at the other end a transverse opening forming a bearing extending therethrough, a sleeve to fit in said bearing, a screw thread in said sleeve for connection with the other service pipe whereby the sleeve may be first connected with said service pipe and the bearing of the bar subsequently applied thereto by upward movement thereon, means for limiting the movement of the bar onto said sleeve, and means for preventing axial movement of said sleeve in said bearing.

7. In a meter connection, the combination of a rigid one-piece service pipe spacing bar adapted to extend substantially horizontally, said bar carrying at one end means for communicatingly connecting one of the service pipes with one of the meter pipes and said bar having in its other end an integral socket bearing extending transversely therethrough, a sleeve member to fit in said bearing and provided at its upper end with means whereby it may be connected independently of the bar to the end of the other service pipe, said sleeve constructed at its lower end to directly receive and engage said socket bearing by shifting the bar upwards toward the service pipe and onto the sleeve thereon and means for holding said bar connected with said sleeve.

In testimony whereof, I have hereunto affixed my signature.

THOMAS F. NOONAN.